United States Patent [19]

Roselli

[11] 4,127,763
[45] Nov. 28, 1978

[54] HEATED WINDOW WITH A MOISTURE SENSOR HAVING A HIGH IMPEDANCE

[75] Inventor: Sergio Roselli, Pisa, Italy

[73] Assignee: Saint-Gobain Industries, Neuilly-sur-Seine, France

[21] Appl. No.: 692,141

[22] Filed: Jun. 2, 1976

Related U.S. Application Data

[63] Continuation-in-part of Ser. No. 568,997, Apr. 17, 1975, Pat. No. 4,032,745.

[30] Foreign Application Priority Data

Jun. 2, 1975 [FR] France .................................. 75 17091

[51] Int. Cl.² ............................ H05B 1/02; E06B 7/12
[52] U.S. Cl. ................................. 219/203; 15/250.05;
73/73; 200/61.05; 219/509; 219/522; 219/547;
318/483; 338/35; 340/602; 340/604
[58] Field of Search ............... 219/203, 522, 547, 509;
338/34, 35; 340/234, 235; 73/73; 200/61.05,
61.06, 61.04, 61.07; 318/DIG. 2, 483;
15/250.12, 250.05

[56] References Cited

U.S. PATENT DOCUMENTS

| | | | |
|---|---|---|---|
| 3,056,935 | 10/1962 | Jensen | 338/35 |
| 3,139,085 | 6/1964 | Custance et al. | 340/235 |
| 3,705,375 | 12/1972 | Hershler | 338/35 |
| 3,891,958 | 6/1975 | Wakabayashi | 338/35 |
| 3,916,367 | 10/1975 | Nicholas et al. | 338/35 |
| 3,995,140 | 11/1976 | Kuiff et al. | 219/509 |
| 4,048,469 | 9/1977 | Ciarniello et al. | 219/203 |

*Primary Examiner*—Thomas J. Kozma
*Attorney, Agent, or Firm*—Pennie & Edmonds

[57] ABSTRACT

A window has a heating grid and a moisture sensor formed thereon for connection to a detector which automatically controls the heating. The sensor has an output terminal and another terminal connected to a heating conductor, the sensor being positioned outwardly of the heating grid with the area of the sensor including the output terminal lying in the heating zone. Advantageously the outer limit of the sensor is closely adjacent the outer limit of the heating zone. The output terminal is positioned between the outward limit of the sensor electrodes and the boundary heating conductor. A shield electrode connected to the heating conductor may be provided. The sensor may be located between a pair of heating conductors adjacent a heating grid collector with one electrode connected to the conductors. For deep windows, the sensor may be located in an offset branched section of a boundary heating conductor.

10 Claims, 7 Drawing Figures

HEATED WINDOW WITH A MOISTURE SENSOR HAVING A HIGH IMPEDANCE

This application is a continuation-in-part of application Ser. No. 568,997 filed Apr. 17, 1975, now U.S. Pat. No. 4,032,745, for "Automatic Control of Window Heaters".

The present invention relates to a window equipped with a printed heating network or grid which is controlled by means of a moisture detector designed to detect the presence of a deposit capable of obscuring visibility.

Windows of this type are known. They comprise one or more sensors which are located at a distance from the heating network or grid corresponding to the limit of the region cleared by the latter and which are connected to a control circuit so as to trigger the heating system when this region is clouded over but to interrupt it as soon as the region has been cleared. According to the method currently considered the most satisfactory, the sensor is produced by the silk screen technique at the same time as the heating network and its electrodes are reinforced and then protected in the same way by means of a deposit of copper and nickel. These sensors generally consist of two electrodes in the form of interdigitated combs defining an active zone disposed astride the border of the heated region and the teeth of which are preferably vertical.

The two combs can each be connected to a free terminal, but it is preferable, both to reduce the cost and also to reduce the size of the detector, to connect one of the electrodes directly to ground by one of the collectors of the heating network or, alternatively, to connect this electrode as close as possible to one of the printed resistive bands or conductors constituting this network; this being achieved at the cost of certain precautions involved in the design of the electronic control circuits used therewith. This solution is especially suitable when two separate sensors are used or when, for example, the sensor is placed on the axis of the window at the upper part of the region to be cleared. In this latter case, the lower part of the electrodes is located in the immediate vicinity of the upper resistive band or conductor which is advantageously used as the terminal for one of the combs. The effective heating range of this resistive band covers a width of 15 to 20 millimeters on either side and the upper part of the sensor is located approximately 20 or 25 millimeters from the resistive band.

Although the electrodes are minimally soluble, it is preferable to carry out detection by means of an alternating signal and to DC isolate each sensor by means of a capacitance mounted in series with each free terminal so as to eliminate continuous voltages produced between the detection circuit and the heating network as these voltages are capable of causing troublesome polarization and sometimes chemical damage. Even with alternating current, the presence of moisture is detected through the variation in the resistance of the sensor. It is important to select a very high detection threshold, for example, between $10^5$ and $10^6$ ohms. It has been found that this not only increases the stability of operation but it also saves energy owing to more rapid detection of a moisture deposit.

However, the proposed solutions have still not been completely satisfactory. After a specific period of operation the heating system may remain energized even after the visibility zone has been cleared. This phenomenon, which occurs mainly during humid weather when there are a number of occupants in the vehicle, can be attributed to the progressive formation of a wide layer of moisture in the unheated region. This conducting layer is capable of forming, at least in certain types of vehicles, a bridge between the periphery of the sensor, various points on the heating network itself and finally the framework of the window. It thus produces short circuit resistances, the value of which cannot exceed $10^4$ ohms, and as a result, operation is blocked if the regulating threshold selected is higher. In any event continuous annoying or even harmful components are again produced.

The object of the present invention is to obviate this type of difficulty. It is proposed to avoid any kind of conducting bridge between the free terminal of the sensor and other points such as the edge of the window. Accordingly, it is proposed to situate the entirety of each sensor, including its electrodes and supply terminals, within the outer limit of effectiveness of the heating conductors. This being the case, even in the presence of a relatively large deposit, the sensor is rapidly surrounded by a non-conductive zone which eliminates any leakage so that the heating action is stopped as soon as the window is sufficiently cleared of moisture in the visibility range. Disturbing currents are also eliminated.

As indicated above, it is known to employ a high threshold impedance for detection, in order to promote rapid detection of a moisture deposit. With the sensor situated entirely within the effective area of the heating conductors, as above described, a high threshold can activate the heating conductors even before the moisture deposit becomes visible. Thus, when the condensation is small, the limit of the visibility zone, while closing in, will remain outside the sensor area. Further, with the sensor entirely within the heating zone, heating will be discontinued promptly when no longer required to clear the visibility zone.

According to an advantageous feature of the invention, the limit of the active zone of the sensor which is disposed furthest away from the heating conductors is located in the immediate proximity of the corresponding outer edge of the sensor and also in the immediate proximity of the outer limit of the heating zone. It is thus possible to avoid reducing the size of the visibility zone to an excessive degree.

In the first embodiment, the sensor is placed along the upper band or conductor of the heating network or grid, and the distance between the latter and the edge of the window is sufficiently small to permit connection of the connection cable. The principle of this embodiment consists in reducing the height of the sensor while avoiding increasing its width such that the comb system including its connection terminal is located entirely within the effective zone of influence of the resistive heating conductor. During the initial heating stage, there is a parasitic current inside the sensor which does not constitute an actual disadvantage because it is transitory.

In a second embodiment isolation of the sensor is ensured by a protective element connected at a potential very close to that of the connection to the heating network and which encloses the electrode connected to the free terminal. The protective element will preferably be sufficiently close to the latter electrode to constitute a part of the second electrode. Similar isolation can be obtained by positioning the sensor between two conductors of the heating network at a suitably selected position within the heated zone. This solution eliminates continuous components from the start.

An especially important variant consists in producing an auxiliary heating zone outside and adjacent the visibility zone per se, in the vicinity of the edge of the window. The sensor is placed inside this auxiliary heating zone, preferably between two branched heating wires, the section and spacing of which are such that the heating conditions reproduce in an optimum manner the conditions prevailing inside the visibility zone. It is possible to use a plurality of sensors, but it is sufficient and preferable to provide only a single sensor and in this case to place it at the upper part of the window. Many vehicles now possess very deep rear windows. The resistive bands forming the upper and lower boundaries of the heating network are therefore located fairly far away from the corresponding edges of the window as it would be difficult to clear the entire surface of the window without consuming excessive electricity. In such a case, it is not advisable to make a connection to the free terminal of the sensor by means of a printed wire crossing the moist zone or to locate it at a considerable distance from the edge of the window as it would otherwise be necessary to supply the detector by means of a correspondingly long cable. This cable would be very conspicuous, and detrimental both in terms of visibility and vulnerability. This variant is especially adapted to such situations.

It is possible to construct the upper edge of the sensor as a channel or gutter in a manner known per se. Then droplets formed by condensation can flow away from the active zone between the electrodes. It is even more desirable to protect the active zone by means of an independent channel.

Various embodiments of the invention, provided by way of example only, will be described hereinafter with reference to the accompanying drawings in which.

In all the sensors shown in these figures, a portion of at least one of the resistive heating bands or conductors serves as the connection to one electrode or comb of the sensor. This feature is not absolutely essential but it is advantageous as it enables the height of the sensor to be reduced. It also improves operation during very cold weather by eliminating the possibility of ice formation.

Figure 1:
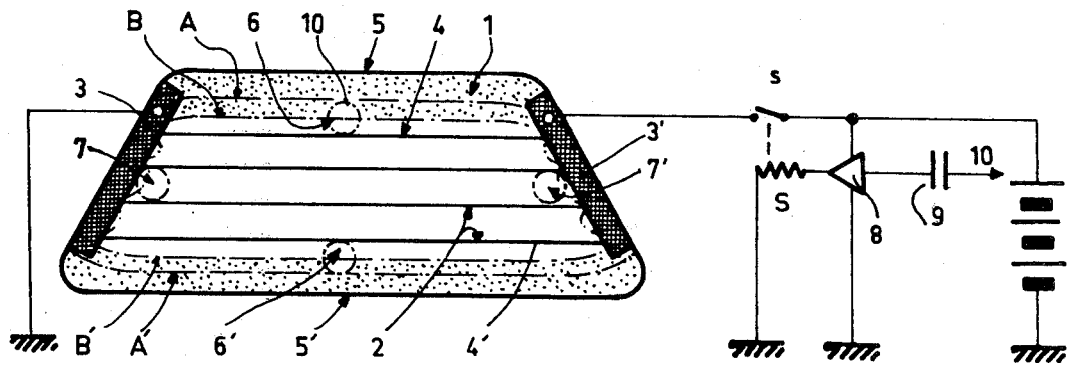
FIG. 1 shows a shallow rear heated window equipped with a moisture or humidity sensor.

The rear heating window 1, according to FIG. 1, is equipped with a network or grid 2 of horizontal printed resistive heating conductors connected between two common bus conductors or collectors 3 and 3'. This network is preferably formed by means of an electroconducting frit deposited by the silk screen technique and then incorporated in the glass by firing, and subsequently reinforced and protected by electoplating. The grid covers the major part of the window 1 and the outer or boundary resistive bands 4, 4' are located at a fairly short distance from the corresponding edges 5, 5' of the window 1. When the heating grid is switched on, the cleared zones surrounding each resistive conductor progressively grow closer together and the region which the grid is capable of clearing stops along two lines A, A'. The distance between the lines A, A' and the upper and lower heating conductors 4, 4' can reach about 20 to 25 millimeters depending on the atmospheric conditions. In fact, if the system comprises automatic control means and the detector consists, for example, of a moisture or humidity sensor disposed at 6 on the axis of symmetry of the window above the upper heating conductor, the heating system ceases to operate slightly earlier. Such cessation occurs when the upper limit of the cleared zone (which progresses upwards from the upper heating conductor 4 during operation of the heating system) has sufficiently cleared the active zone formed by the electrodes of the sensor, reaching, for example, two lines B, B' whose location depends on the form of the sensor and the regulation of the detector.

The detector can include further moisture sensors located, for example, at 6' beneath the lower heating conductor, at 7 along the collector or bus connected to ground, or at 7' along the collector supplied by the positive terminal of the battery. A control circuit 8, which is supplied by the battery, is connected by means of a capacitor 9 to the free terminal 10 of the sensor so that the signal from the detector opens or closes the control contact s of the heating grid by means of a relay S as a function of the absence or presence of moisture on the inner face of the window where the sensor or sensors are located.

Figure 2:
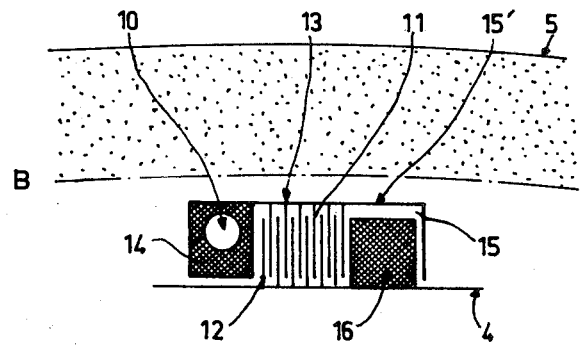
FIG. 2 is a detailed view of a sensor according to the invention designed for use in the window of FIG. 1.

FIG. 2 shows the inner structure of a sensor according to the invention which is utilizable at position 6 of FIG. 1. This sensor, which is approximately 15 millimeters in height, comprises two electrodes 11 and 12 consisting of interdigitated combs. The vertical teeth of comb 12 are connected directly to the heating conductor 4. The vertical teeth of comb 11 are connected by an upper collector conductor 13 (forming the back of the comb), to a conducting surface 14 used to secure the connection terminal 10. The surface 14 is situated beneath the comb back 13 such that the part 15 of the active zone furthest away from the heating conductor 4 is only separated from the outer edge of the sensor furthest away from this heating conductor by the thickness of 13, i.e., by some tenths of millimeters. As a result, the limit of the clouded region formed by the line B is located at approximately 1 mm from the sensor, such that a zone 15', having a greater resistance than the internal resistance of the sensor, is produced between the latter and the ground constituted by the bodywork of the vehicle along the upper edge 5, before heating is ceased.

The sensor also includes a secondary conducting surface 16 connected to the heating conductor 4 which is intended to facilitate electroplating. An electroplating electrode connected to the surface 14 of the upper comb will also be brought into contact with the surface 16, thereby enabling the metal deposit on the teeth of the lower comb to be reinforced. If this precaution were not taken, the density of the electroplating current would tend to be reduced in the corresponding zone owing to the relatively large surface area of the printed network at the location of the sensor and owing to the voltage gap between its two combs.

Figure 3:
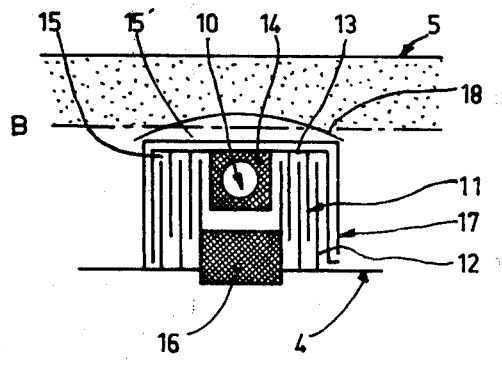
FIGS. 3 and 4 show two advantageous variants of the preceding sensor.

In the embodiment represented in FIG. 3, the design of the sensor is similar, but the two conducting surfaces 14 and 16 are disposed one above the other. This enables the width of the sensor to be reduced without excessively increasing its height. In addition the electrode 11, connected to the free terminal 10, is enclosed by a conductor 17 connected to heating conductor 4 and hence forming part of electrode 12. Conductor 17 constitutes a shield which isolates the electrode 11 from the ground constituted by the bodywork along the edge of the window. As the electrode 11 is itself DC isolated by the capacitor 9 (FIG. 1), there can be no appreciable continuous voltage between the sensor electrodes. The external leakage current is not disturbing on the whole and furthermore remains weak if the sensitivity of the sensor is suitably adjusted, as the limit of the visibility zone is again moved back beyond the outer edge. The conductor 17 also guards against any possible drops of condensate flowing into the active zone 15, but it is advantageous to provide a channel or gutter 18 thereabove which can extend into the moist region without any disadvantage. The teeth 11 of the comb electrode are terminated within a few millimeters of the heating conductor 4, with the exception of the two outer teeth which descend to within a few tenths of a millimeter.

Figure 4:
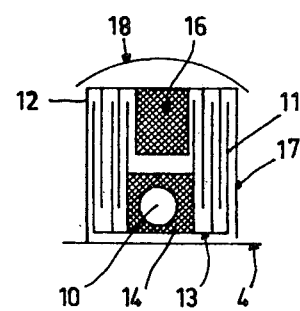

The sensor shown in FIG. 4 is also similar, but the comb 11 with the terminal 10 is inverted. The collector 13 thus runs along the resistive heating conductor 4 at some tenths of a millimeter therefrom. The other comb is also inverted, with the back thereof connected to heating conductor 4 and the back and outer teeth forming a shield around comb 11.

Figures 5, 7:
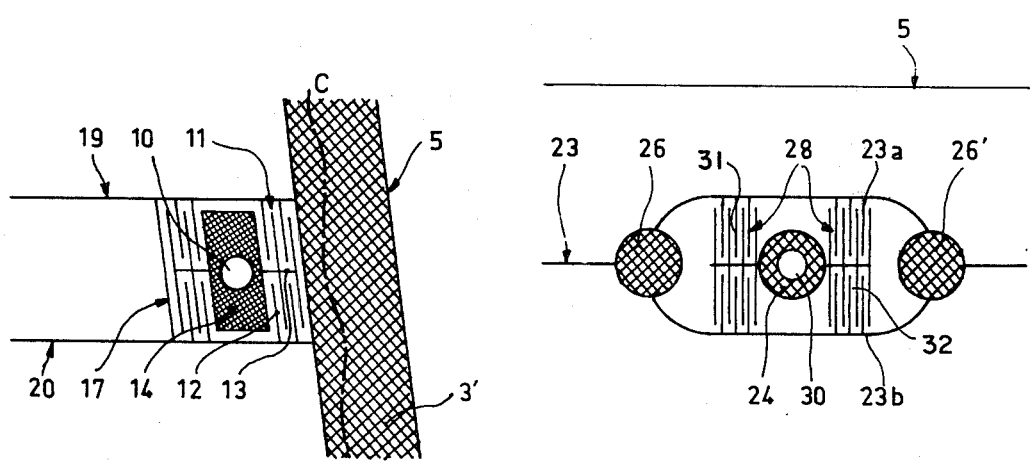
FIG. 5 is a detailed view of a sensor placed between two resistive bands of the heating grid.
FIG. 7 shows a sensor designed for use on the window of FIG. 6.

FIG. 5 shows the inner structure of a sensor laterally disposed between two heating conductors, for example at 7' (FIG. 1) on one of the sides of the window. The comb formed by the electrode 12, connected to the heating grid, is double, and comprises two sets of vertical teeth, one set being connected to the upper heating conductor 19 and the other to the lower heating conductor 20. The complementary electrode 11 has teeth connected by a median collector 13 to a conducting surface 14 on which the connection terminal 10 is affixed. An auxiliary conducting surface is formed by the bus or collector 3' of the heating network. The heating action ceases when the cleared zone reaches a line corresponding substantially to the line C. The sensor is then entirely situated in a dry zone and is also surrounded on three sides by conductors situated at the potential of the electrode 12. It is possible, but not especially advantageous, to provide the sensor with a shield conductor 17 on its fourth side.

Figure 6:
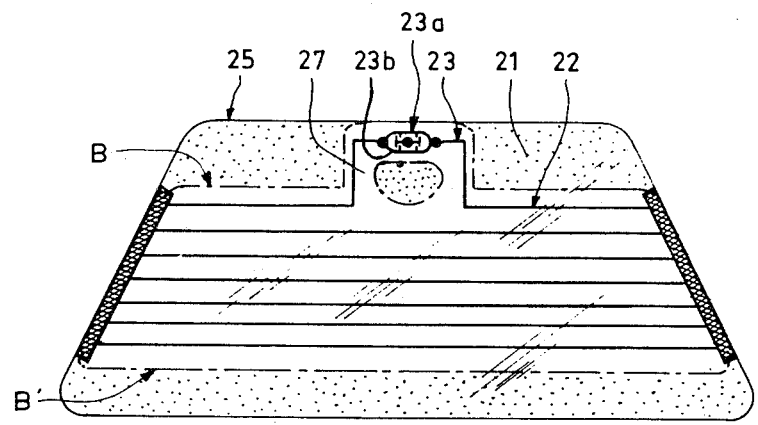
FIG. 6 shows a very deep rear window equipped with a sensor according to the invention.

FIG. 6 shows a deep rear window 21, the upper heating conductor 22 of which is located at a considerable distance from the upper edge 25. This distance can be as great as 200 mm and more. According to the invention, the median part 23 of the heating conductor 22 is nevertheless situated close to the upper edge 25 of the window in the central zone, over a distance of up to approximately 10 cm., and it is divided in its middle part into two branches 23a, 23b, thus producing a secondary visibility zone 27 in which the moisture sensor is situated. The sensor is represented in FIG. 7 and has a form similar to that of FIG. 5. The two branches 23a, 23b are connected in parallel by two auxiliary surfaces 26, 26'. They have a rounded shape which, with the upper branch of the sensor, facilitates the flow of water over the sides outside of the active zone 28. Respective sets of teeth of one electrode 31 are connected to respective branches 23a and 23b. The teeth of the other electrode 32 are connected to a conducting surface 24 to which is attached the connection terminal 30.

The diversion of water referred to in the foregoing, as by channels or gutters, is due to the fact that the printed conductors are raised in relief from the surface of the window.

As will be noted, in the illustrated embodiments the output terminal is positioned between the heating conductor to which one electrode of the sensor is connected and the outward limit of the electrodes of the sensor, or between two heating conductors. Thus, with the sensor positioned within the heating zone of the heating grid, and advantageously with the outer limit of the sensor closely adjacent the outer limit of the heating zone, the terminal area is cleared of moisture as soon as the active area of the sensor so that leakage paths which could prolong the energization of the heating grid after the desired area of the window has been cleared are avoided.

I claim:

1. A heated window having a heating grid formed of a plurality of resistive heating conductors and a moisture sensor formed on the window for connection to a moisture detector for automatically controlling the energization of the heating grid, said sensor having a first electrode connected to an output terminal and a second electrode connected to a heating conductor of the heating grid, the area of the sensor including said output terminal being disposed within the heating zone of the heating grid and said output terminal being positioned closer to the center of the heating zone than the edge of the area of said sensor furthest from the center of the heating zone.

2. A heated window according to claim 1 in which said sensor is positioned outwardly of the heating grid and said second electrode is connected to a boundary heater conductor of the heating grid.

3. A heated window according to claim 2 in which the outer limit of said area of the sensor is closely adjacent the outer limit of said heating zone.

4. A heated window according to claim 2 in which said output terminal is positioned between the outward limit of the electrodes of said sensor and said boundary heating conductor.

5. A heated window according to claim 4 in which said sensor is positioned along and above the uppermost heating conductor intermediate the ends of the heating conductor.

6. A heated window according to claim 5 in which said second electrode is connected to said uppermost heating conductor, and including a shield electrode adjacent and outside the sides and top of said first electrode and connected to said heating conductor.

7. A heated window according to claim 1 further characterized by said resistive conductors extending in spaced parallel relationship between common collectors, said sensor being positioned adjacent one of said collectors between a pair of adjacent heating conductors, said sensor having a first electrode connected to an output terminal and a second electrode connected to said pair of adjacent heating conductors at points adjacent said one collector.

8. A heated window according to claim 7 in which said second electrode includes a conductor positioned outside said first electrode on the side thereof away from said one collector.

9. A heated window according to claim 1 further characterized by a boundary heating conductor of the heating grid having an intermediate branched section with two spaced branches connected in parallel, said sensor being positioned between said spaced branches and having a first electrode connected to an output terminal and a second electrode connected to said spaced branches.

10. A heated window according to claim 9 in which said intermediate branched section is offset outwardly with respect to the remainder of said boundary heating conductor.

* * * * *